United States Patent
Leuze et al.

(10) Patent No.: US 11,484,955 B2
(45) Date of Patent: Nov. 1, 2022

(54) CUTTING TOOL HAVING COOLANT DEFLECTION

(71) Applicant: KOMET DEUTSCHLAND GMBH, Besigheim (DE)

(72) Inventors: Peter Leuze, Walheim (DE); Sigurd Schwarz, Besigheim (DE); Thomas Trinkner, Besigheim (DE); Viktor Vogel, Besigheim (DE)

(73) Assignee: KOMET DEUTSCHLAND GMBH, Besigheim (DE)

( * ) Notice: Subject to any disclaimer, the term of this patent is extended or adjusted under 35 U.S.C. 154(b) by 291 days.

(21) Appl. No.: 16/661,780

(22) Filed: Oct. 23, 2019

(65) Prior Publication Data
US 2020/0055129 A1 Feb. 20, 2020

Related U.S. Application Data

(63) Continuation of application No. PCT/EP2018/061225, filed on May 2, 2018.

(30) Foreign Application Priority Data

May 2, 2017 (DE) ..................... 10 2017 109 369.9

(51) Int. Cl.
*B23C 5/28* (2006.01)
*B23B 51/06* (2006.01)
*B23D 77/00* (2006.01)

(52) U.S. Cl.
CPC ................ *B23C 5/28* (2013.01); *B23B 51/06* (2013.01); *B23D 77/006* (2013.01)

(58) Field of Classification Search
CPC . B23C 5/28; B23C 2240/245; B23C 2250/12; B23D 77/006; B23B 51/042; B23B 51/0486; B23B 51/06; B23B 2240/24
See application file for complete search history.

(56) References Cited

FOREIGN PATENT DOCUMENTS

| DE | 101 45 006 A1 | 4/2003 |
| DE | 10 2010 046 044 A1 | 4/2011 |
| DE | 10 2011 050 176 A1 | 11/2012 |
| EP | 1 951 466 B1 | 4/2010 |

(Continued)

OTHER PUBLICATIONS

English translation of JP 2006218549 A (Year: 2006).*

(Continued)

*Primary Examiner* — Alan Snyder
(74) *Attorney, Agent, or Firm* — Bose McKinney & Evans LLP

(57) ABSTRACT

This disclosure relates to a cutting tool having a tool head that can be rotated about its mid-axis and has a front end face and a circumferential surface, a plurality of cutting elements and associated chip grooves arranged to be distributed in the circumferential direction on the circumferential surface, and a channel system running through the tool head for the coolant supply to the cutting elements. According to this disclosure, the end face of the tool head has coolant grooves, which each lead from an outlet opening of the channel system to an end opening in a chip groove, wherein the longitudinal openings of the coolant grooves are covered by a baffle plate fixed to the front face of the tool head.

16 Claims, 2 Drawing Sheets

(56) References Cited

FOREIGN PATENT DOCUMENTS

| EP | 2 298 483 A1 | 3/2011 | | |
|----|----|----|----|----|
| JP | 2006218549 A | * | 8/2006 | ............... B23C 5/08 |
| JP | 2014-30888 A | | 2/2014 | |
| WO | WO 01/58632 A1 | | 8/2001 | |
| WO | WO 2014/091748 A1 | | 6/2014 | |
| WO | WO 2014/186812 A1 | | 11/2014 | |

OTHER PUBLICATIONS

English translation of the International Search Report, PCT/EP2018/061225, dated Aug. 1, 2018, 3 pages.

English translation of the International Preliminary Report on Patentability and Written Opinion of the International Searching Authority, PCT/EP2018/061225, dated Nov. 14, 2019, 7 pages.

\* cited by examiner

CUTTING TOOL HAVING COOLANT DEFLECTION

RELATED APPLICATIONS

This application is a continuation of PCT/EP2018/061225, filed May 2, 2018, which claims priority to DE 10 2017 109 369.9, filed May 2, 2017, the entire disclosures of both of which are hereby incorporated herein by reference.

BACKGROUND

This disclosure relates to a cutting tool, in particular a milling cutter, boring tool or reamer, comprising a tool head, which can rotate about its central axis and comprises a front end face and a circumferential surface, a plurality of cutting elements and associated flutes that are distributed over the circumferential surface in the circumferential direction, and a channel system, which runs through the tool head and supplies coolant to the cutting elements.

When face milling complex component structures, for example, engine blocks made of aluminum, it is often a problem that the chips produced are flung against the workpiece and remain in recesses in the component. In conventional milling cutters, the coolant jet is guided directly out of the tool head towards the cutting edge. If the workpiece comprises holes or embedded channels on the surface to be machined, chips are also flushed into the cavities. This involves a large amount of cleaning effort since the chips are difficult to remove and the process is usually not reliable. The finished components have to undergo a complex process of checking for any leftover chips, with the rejection of workpieces that are complex to produce having to be expected in several cases.

SUMMARY

Proceeding herefrom, this disclosure teaches cutting tools that avoid the above-mentioned disadvantages. This disclosure teaches how to remove the chips from the workpiece in order to achieve a high degree of manufacturing quality.

The concept of this disclosure is to use simple measures to deflect the coolant at the tool end face in order to keep the workpiece free of chips. Accordingly, this disclosure teaches providing the end face of the tool head with coolant grooves, each of which leads from an outlet of the channel system to a mouth in a flute, and covering the longitudinal openings in the coolant grooves by a baffle disk that is fixed to the end face of the tool head. The coolant grooves that are open towards the front can therefore easily be made in the end face of the tool head, while the baffle disk covering the openings ensures that the coolant jet does not freely escape easily, but is targetedly deflected towards the edge by imprinting a backwards component. As a result, the impinging coolant or the cutting fluid cannot travel forwards, but is diverted towards the back into the tensioning channel, taking the chips with it.

One embodiment provides that the coolant grooves extend from the outlet towards the mouth counter to the direction of rotation of the tool head. This prevents coolant and the chips leaving radially, and instead being pushed towards the cutting body.

This disclosure can additionally be improved in this regard by the coolant grooves extending obliquely, in a curved manner or tangentially so as to deviate from a radial direction, and by the mouth being made in a wall of the flute and being oriented towards a cutting edge of a cutting element.

The cutting element advantageously delimits a chip removal surface that leads backwards away from the end face and keeps the chip flow away from the workpiece.

In this connection, it is expedient for the chip removal surface to be positively inclined towards the back with respect to the central axis, and for the radial cross section of the chip removal surface to have a V-shaped or concave cross sectional contour, preferably a cross sectional contour that flattens towards the back, with respect to the central axis.

In order to assist with the backwardly directed chip removal by means of a suction effect or a turbine effect, it is advantageous for the cutting element and/or the particular flute to delimit a chip removal funnel that gets wider towards the back.

Another design simplification is achieved in that the baffle disk is formed by a toothed ring, the radially projecting toothed segments of which cover the coolant grooves.

It is also advantageous from a manufacturing point of view for the baffle disk to be cut out from a piece of flat material, in particular by means of a sheet metal working method, such as water jet cutting or laser cutting.

The channel system advantageously comprises a plurality of supply holes made in the tool head, which each extend to an outlet.

It is also advantageous for the supply holes to branch off from a central channel that extends axially through the tool head and to extend obliquely outwards away from the central axis.

The measures according to this disclosure can be implemented particularly advantageously in a cutting tool in which the cutting elements are formed by a cutting plate that is mounted on a particular circumferential plate seat of the tool head, whereby between 4 and 50 cutting elements can be arranged on the tool head so as to be preferably uniformly distributed over in the circumferential direction.

In order to conduct fluid, it is also advantageous for the coolant grooves to have a length in the range of from 1 to 10 mm.

In order to supply coolant in a particularly expedient manner in the vicinity of the cutting elements, it is advantageous for the coolant grooves to lie entirely in an edge region of the end face, whereby the edge region extends radially by an amount that is equal to between 0.6 and 1.0 times, and preferably 0.7 and 1.0 times, the radius of the end face.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

It shall be understood that terms such as "horizontal" and "vertical" are generally used herein to establish positions of individual components relative to one another rather than an absolute angular position in space. Further, regardless of the reference frame, in this disclosure terms such as "vertical," "parallel," "horizontal," "right angle," "rectangular" and the like are not used to connote exact mathematical orientations or geometries, unless explicitly stated, but are instead used as terms of approximation. With this understanding, the term "vertical," for example, certainly includes a structure that is positioned exactly 90 degrees from horizontal, but should generally be understood as meaning positioned up and down rather than side to side. Other terms used herein to connote orientation, position or shape should be similarly interpreted. Further, it should be understood that various structural terms used throughout this disclosure and claims should not receive a singular interpretation unless it is made explicit herein. By way of non-limiting example, the terms "cutting element," "groove," "flute," and "funnel," to name just a few, should be interpreted when appearing in this disclosure and claims to mean "one or more" or "at least one." All other terms used herein should be similarly interpreted unless it is made explicit that a singular interpretation is intended.

Figure 1:
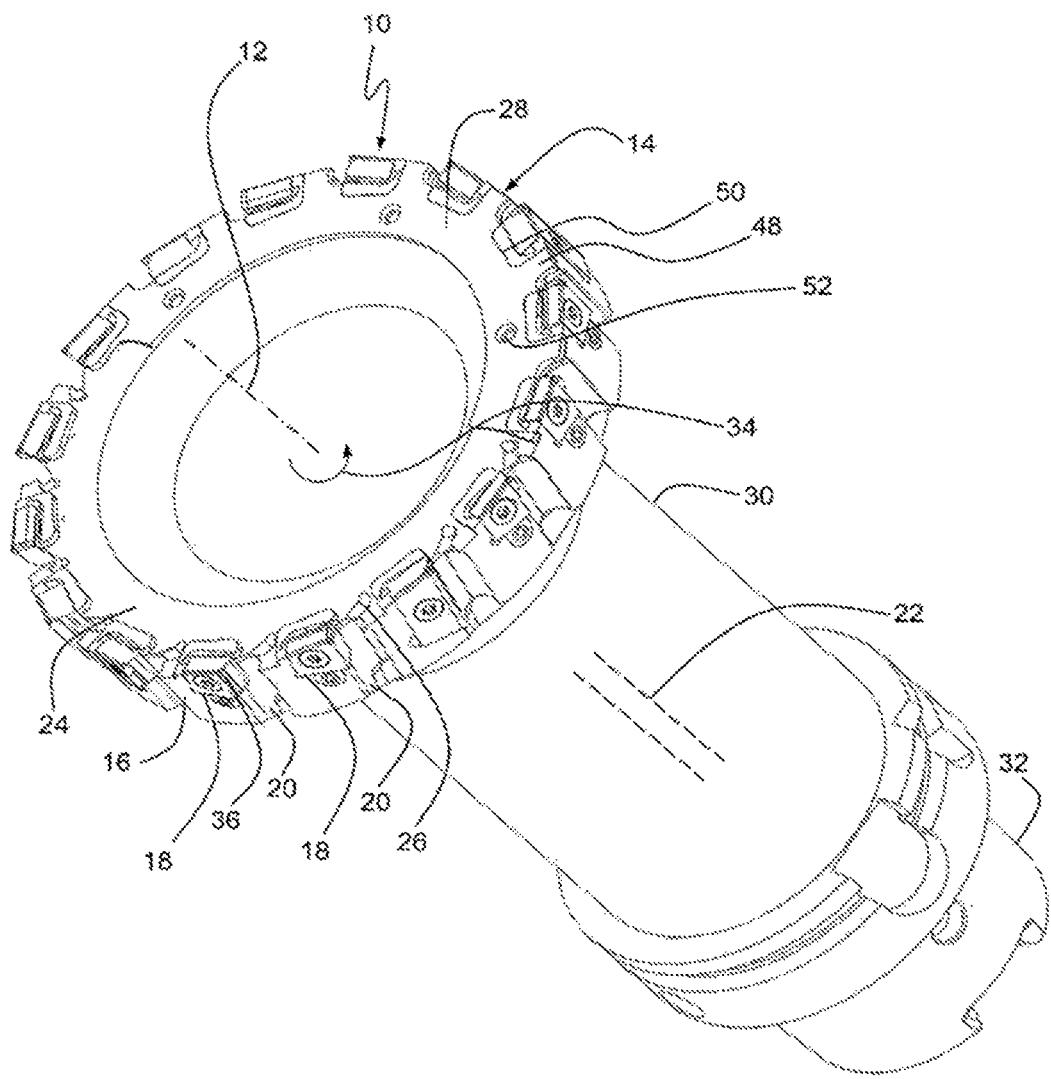
FIG. 1 is a perspective view of a face milling cutter comprising an end-face baffle disk, shown dismantled, for deflecting the coolant.

The face milling cutter 10 shown in the drawings comprises a tool head 14, which can rotate about its central axis 12, on the circumferential surface 16 of which a plurality of cutting elements 18 and associated flutes 20 are formed and inside which a channel system 22 is formed for supplying coolant and cutting fluid to the cutting elements 18. In this case, coolant grooves 26 made in the end face 24 of the tool head 14 and an end-face baffle disk 28, which covers the coolant grooves 26 and only approximately half of which is shown in FIG. 1, ensure that the coolant is deflected into the flutes 20.

The tool head 14 is retained on a shaft part 30, on the rear end of which an interface 32 is arranged for coupling to a machine spindle. When face milling a workpiece, the face milling cutter 10 is moved perpendicularly to the central axis 12 and rotates in the direction of the arrow 34, whereby the cutting elements 18 machine the material by means of their edge 36 that protrudes at the end face and the circumference, and the chips are targetedly conducted away by means of the backwardly deflected coolant through the flutes 20, as will be explained in more detail below. In the embodiment shown, a flute 20 is assigned to each of the cutting elements 18, but other configurations are also conceivable, for example having two cutting elements per flute that are moved towards one another.

Figure 2:
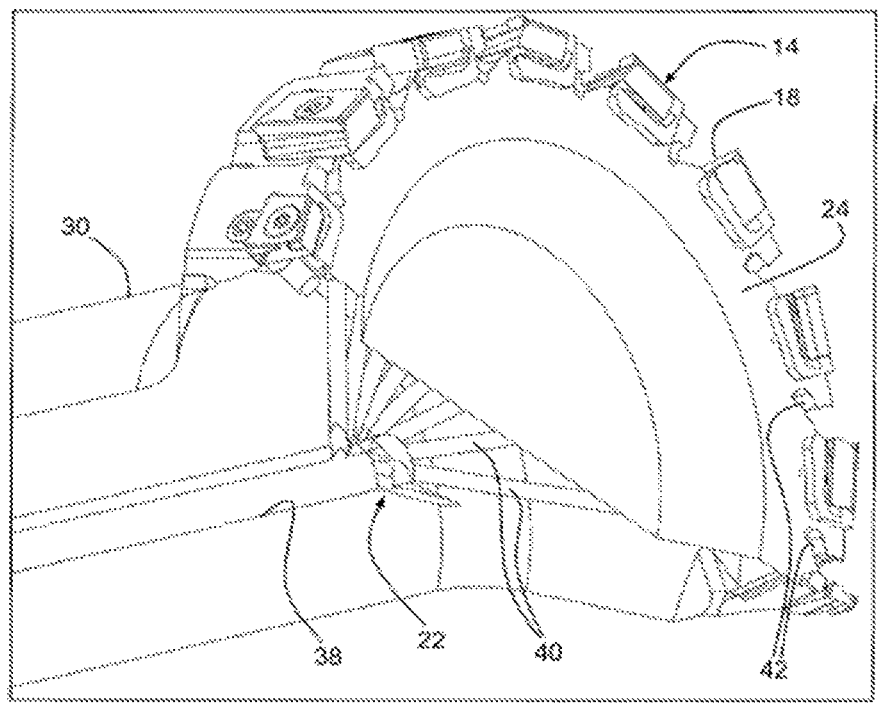
FIG. 2 is an axially sectional and perspective view of the dismantled tool according to FIG. 1.

FIG. 2 shows coolant being supplied by means of the channel system 22 of the tool head 14. The coolant is fed in on the machine side from the interface 32 via an axially extending central channel 38. A plurality of supply holes 40 branch off at the front end of said central channel, each of which holes extend obliquely outwards away from the central axis 12 and open at an outlet 42 near an associated flute 20 in the region of the end face 24 of the tool head 14.

Figure 3:
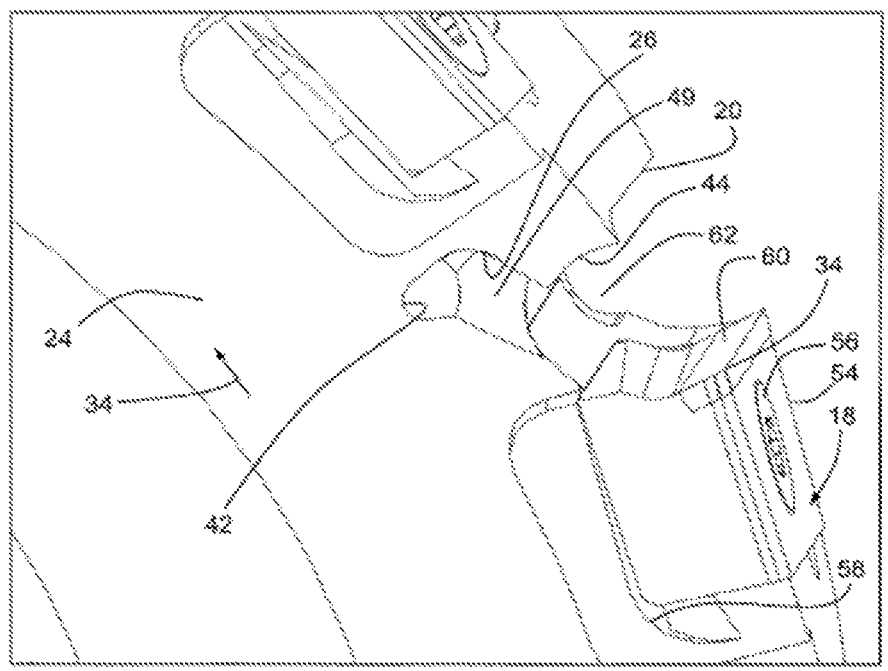
FIG. 3 is an enlarged view of a cut-out of the tool according to FIG. 1.

As can be seen most clearly from FIG. 3, the outlets 42 are each arranged on the bottom of a coolant groove 26, which ends in a mouth 44 in the region of a wall of the flute 20. In this case, the mouth 44 is oriented towards the edge 36 of an opposite cutting element 18. The coolant grooves 26 therefore extend from the outlet to the mouth 44, so as to deviate from a radial direction, counter to the direction of rotation 34 of the tool head 14, whereby the coolant flow occurs under the baffle disk 28 directly at the end face of the edge 36, in a radius to the central axis 12.

The baffle disk 28 is expediently formed by a toothed ring that is circularly closed, the radially protruding toothed segments 48 of which overlap the longitudinal openings 49 in the coolant grooves 26, while the cutting elements 18 are arranged in the region of the spaces 50 between the teeth (FIG. 1). In this case, the baffle disk 28 can be formed from a sheet metal blank, in particular by means of water jet cutting, and can be detachably held on the end face 24 of the tool head 14 by means of connecting means 52.

As can also be seen from FIG. 3, the cutting elements 18 are formed as cutting plates 54, which are each mounted in a circumferential plate seat 58 of the tool head 14 by means of screws 56. In this case, they delimit a chip removal surface 60, which leads backwards away from the end face 24 and, with respect to the central axis 12—as can also be seen from FIG. 1—is positively inclined towards the back and with respect to the central axis 12.

In order to optimize the backwards removal of the chips away from the workpiece, the radial cross section of the chip removal surface 60 has a V-shaped or concave cross sectional contour that flattens towards the back with respect to the central axis. This forms a chip removal funnel 62 that gets wider towards the back, generates a type of turbine effect at high speeds and also improves the tool cooling effect by means of the fluid flow generated.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A tool head for use in a cutting tool, comprising:
   a central axis about which the tool head is rotatable when coupled to a cutting tool;
   a front end face;
   a circumferential surface;
   a plurality of cutting elements and associated flutes distributed circumferentially on the circumferential surface;
   a channel system configured to supply coolant to the cutting elements;
   the front end face having coolant grooves, each of which leads from an associated outlet of the channel system to a mouth in one of the flutes, and wherein at least one of the coolant grooves extends counter to a direction of rotation of the tool head;
   the coolant grooves having longitudinal openings;
   a baffle disk fixed to the front end face and covering the longitudinal openings; and
   the baffle disk is formed by a toothed ring, wherein the baffle disk has radially protruding toothed segments which overlap the longitudinal openings in the coolant grooves while the cutting elements are arranged in the spaces between the teeth.

2. The tool head of claim 1, wherein each coolant groove extends from an associated one of the outlets towards the respective mouth counter to the direction of rotation of the tool head.

3. The tool head of claim 1, wherein the coolant grooves extend obliquely or in a curved manner or tangentially so as to deviate from a radial direction.

4. The tool head of claim 1, wherein each mouth is formed in a wall of an associated flute and is oriented towards a cutting edge of a respective cutting element.

5. The tool head of claim 1, wherein the cutting elements each delimit a chip removal surface that is angled away from the axis of rotation.

6. The tool head of claim 5, wherein the chip removal surfaces are positively inclined with respect to the central axis.

7. The tool head of claim 5, wherein the radial cross section of the chip removal surfaces have a V-shaped or concave cross sectional contour.

8. The tool head of claim 1, wherein the cutting elements and/or the flutes delimit a chip removal funnel.

9. The tool head of claim 1, wherein the radially projecting toothed segments of the toothed ring cover the coolant grooves.

10. The tool head of claim 1, wherein the baffle disk is cut out from a piece of flat material.

11. The tool head of claim 1, wherein the channel system comprises a plurality of supply holes made in the tool head, which each extend to one of the outlets.

12. The tool head of claim 11, wherein the supply holes branch off from a central channel that extends axially through the tool head and extends obliquely outwards away from the central axis.

13. The tool head of claim 1, wherein the cutting elements are formed by a cutting plate mounted on a circumferential plate seat of the tool head.

14. The tool head of claim 1, wherein between 4 and 50 of the cutting elements are arranged on the tool head and are uniformly distributed in the circumferential direction.

15. The tool head of claim 1, wherein the coolant grooves have a length of from 1 to 10 mm.

16. The tool head of claim 1, wherein the coolant grooves lie entirely in an edge region of the end face, the edge region extending radially by an amount that is equal to between 0.6 and 1.0 times the radius of the end face.

* * * * *